Mar. 6, 1923.
A. S. KROTZ
1,447,867
DRIVING LUG FOR TRACTOR WHEELS
Filed May 16, 1921
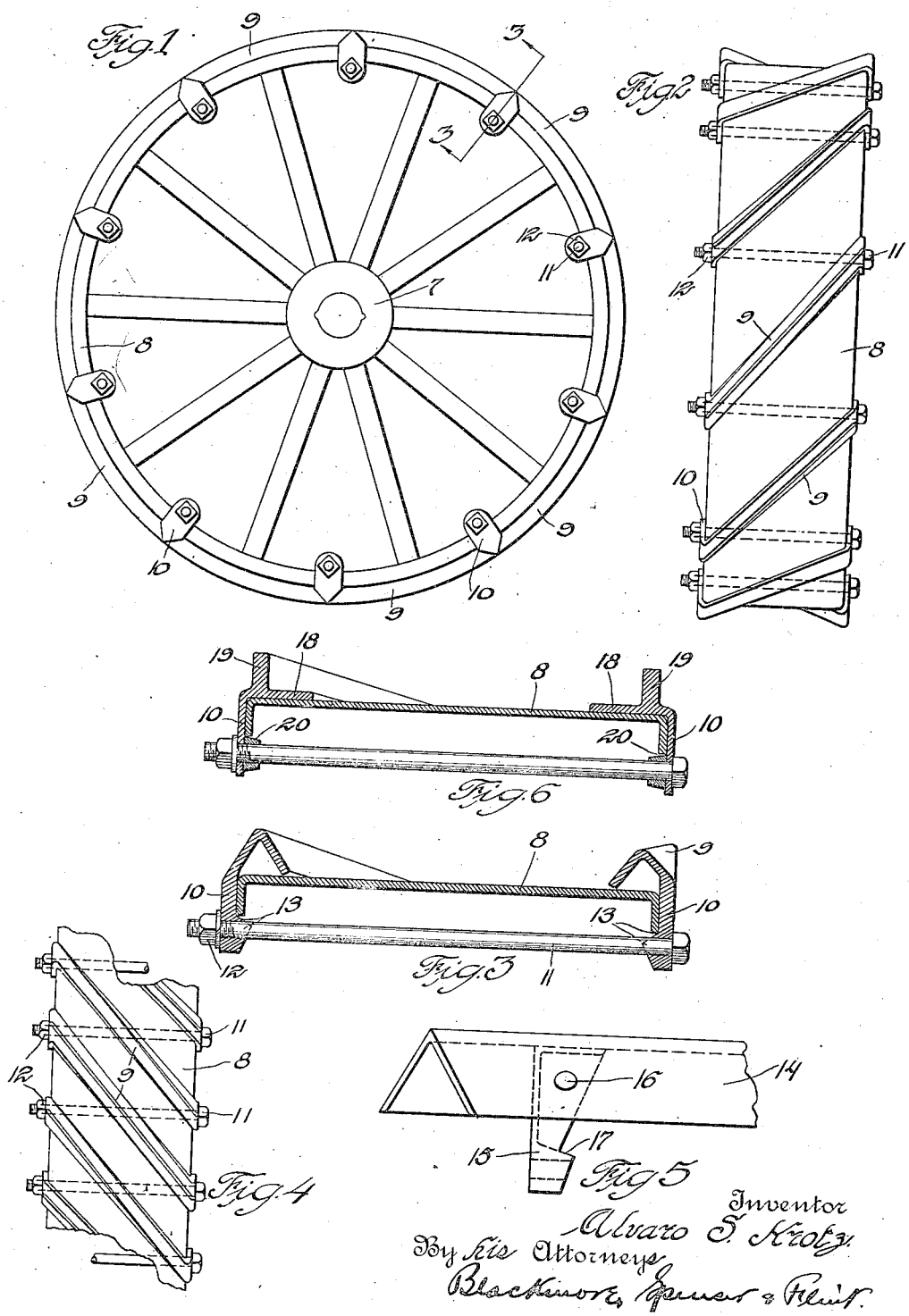

Patented Mar. 6, 1923.

1,447,867

UNITED STATES PATENT OFFICE.

ALVARO S. KROTZ, OF JANESVILLE, WISCONSIN, ASSIGNOR TO GENERAL MOTORS CORPORATION, OF DETROIT, MICHIGAN, A CORPORATION OF DELAWARE.

DRIVING LUG FOR TRACTOR WHEELS.

Application filed May 16, 1921. Serial No. 469,875.

*To all whom it may concern:*

Be it known that I, ALVARO S. KROTZ, a citizen of the United States, and a resident of Janesville, county of Rock, and State of Wisconsin, have invented certain new and useful Improvements in Driving Lugs for Tractor Wheels, of which the following is a full, clear, concise, and exact description, such as will enable others skilled in the art to which the invention relates to make and use the same, reference being made therein to the accompanying drawings, which form a part of this specification.

My invention relates to wheels for various types of vehicles, and particularly to the driving wheels of steam or internal combustion engine driven tractors wherein means are commonly provided for preventing the driving wheels from slipping; my invention having special reference to the driving lugs or cleats with which such wheels are ordinarily provided in order to secure a firm grip upon the ground during the driving of the machine.

The principal object of my invention is to provide improved driving cleats or lugs for use with tractor wheels which will be simple in construction, and effective for the purpose for which they are designed; and which may be readily attached to and detached from a rim unprovided with holes or other features provided expressly for securing the cleats in place; the driving cleats in which my invention consists being fastened to the rim of the wheel by bolts which extend inside the periphery thereof, but which are entirely free from and in no way in permanent engagement with the said rim and require the presence of no special rim construction for enabling the cleats to be secured in place.

A further object of my invention is to provide an improved tractor driving wheel in which the number of driving lugs or cleats spaced about the periphery thereof may vary and in which, conversely, a series of cleats may be attached to wheels varying considerably in diameter one from another; as the construction of the cleats and the manner in which they are attached to the rim of the wheel is such that their spacing may be varied within considerable limits without affecting the security with which they are held in place, and as a matter of course without affecting their driving action when the wheel is in use.

The drawing accompanying and forming a part of this specification illustrates the preferred embodiment of my invention and shows the manner in which the cleats involved therein are secured to a tractor wheel; altho it will be appreciated that the drawing is for illustrative purposes only, and that my invention includes all such variations and modifications of the particular embodiment thereof illustrated as come within the scope of the concluding claim.

Referring now to the drawing;

Figure 1 is a view showing a tractor wheel in side elevation, and equipped with driving cleats made and secured in place upon the rim thereof in accordance with my invention.

Figure 2 is a view showing the wheel shown in Figure 1 in end elevation.

Figure 3 is a view showing a section upon a transverse plane cutting the rim of the wheel and the position of which is indicated by the line 3—3, Figure 1.

Figure 4 is a fragmentary view showing a modified arrangement of driving cleats, and of the manner of attaching the same to the rim of the wheel.

Figure 5 is a fragmentary view showing one end of a slightly modified form of cleat.

Figure 6 is a view upon a transverse plane similar to Figure 3, but showing a slightly modified form of driving cleat and a slightly modified feature as regards the securing thereof to the rim of the wheel.

Referring to the drawing, the reference numeral 7 designates the hub and 8 the periphery or rim of a wheel suitable for use as a driving wheel of a tractor, said elements being connected by suitable spokes as shown, and the rim being illustrated as of channel form in cross-section; this being an ordinary form of tractor wheel and my invention being in no way concerned with the particular features of construction of the hub, spokes and rim of the wheel.

Mounted upon the rim 8 and arranged about the same is a series of driving lugs or cleats each designated by the reference numeral 9, said cleats resting upon the rim and each cleat extending diagonally across the same, as shown, the cleats being thus inclined relative to the plane of rotation of the wheel as will be appreciated. These driving cleats may be formed from cast metal, may be stamped from suitable metal blanks, or may be otherwise formed; and they are preferably angular in cross-section, as shown in Figures 3 and 6, in order to secure a sufficient grip upon the ground while at the same time causing as little disintegration thereof as is consistent with the preventing of the wheel from slipping. Each of these driving cleats is provided with two inwardly extending arms located one adjacent each end thereof, and both of which are designated by the reference numeral 10 and which arms, when the cleats are in place upon the rim of the wheel, are located one upon each side of the rim as clearly shown in the drawing. The lower or inner ends of the cleats are provided with holes located beyond the inner limits of the rim; and the reference numerals 11 designate bolts extending through the holes in the arms 10 and whereby the cleats are held in place upon the rim of the wheel.

The cleats as explained are arranged angularly upon the rim of the wheel, while the securing bolts extend at right angles to the plane of the wheel; from which it follows that the two ends of each bolt extend one through the hole in an inwardly extending arm 10 of one lug while its other extends through the hole in the arm of another lug and which arm is located directly opposite said first mentioned arm; the two arms in question being arms of different cleats and each bolt thus extending through the holes in the inwardly extending arms or different ones of the series of cleats upon the rim. The arrangement of the cleats may be as shown in Figures 1 and 2 in which the arms through which each bolt 11 extend are oppositely disposed arms of successive cleats, or as shown in Figure 4 in which there is an intervening cleat between each two cleats the arms of which are held together by each securing bolt 11.

I preferably provide inclined surfaces 13 adjacent the inner ends of the arms 10 which engage the inner edges of the sides of the rim, to thereby provide a wedging action as the nuts are screwed up upon the bolts 11; with the result that the cleats are drawn down onto the rim and held in place thereupon more securely, and are more certainly prevented from moving therefrom than would be the case if such elements were not present. The wedging action produced by said inclined portions also acts to prevent the slipping of the entire series of cleats circumferentially of the wheel, which might occur if friction between the inner surfaces of the arms 10 and the sides of the rim produced by the tightening of the bolts was relied upon entirely for preventing such circumferential slipping of the cleats.

It will be appreciated from the foregoing that a series of cleats may be secured in place upon wheels differing somewhat in diameter, as no holes have to be provided for securing the cleats in place and as such variations in circumference or length of the series as may occur in practice will be compensated for by the looseness between the several bolts, and by slight variations in the direction in which the bolts extend, as it will be appreciated that the bolts need not extend exactly at right angles to the plane of the wheel. Furthermore, the number of cleats upon a wheel is capable of variation to an appreciable extent by varying the angularity of the securing bolts; and the number of cleats employed may be doubled by adopting the arrangement and the scheme of securing the cleats to the rim illustrated in Figure 4. It is further evident that cleats of given dimensions and of standard forms may be secured to wheels the width of the rim of which varies within quite considerable limits, and that in all cases the cleats may be readily attached to and detached from the wheel if and when it becomes necessary to do so. In all cases, and because of the fact that the ends of each cleat are secured, respectively, to ends of other cleats of the series, it follows that each separate cleat is securely held in place and that all are maintained in proper relationship with one another; because of the interconnection throughout the series of the arms at ends of any particular cleat with oppositely disposed arms of other cleats of a series throughout the entire extent thereof, through and by means of the transverse bolts 11, as herein explained.

Figures 1, 2 and 3 show a form of my invention wherein the driving cleats and the arms at the ends thereof are integral, and in which the cleat itself does not extend beyond the planes of the sides of the wheel. In the form of my invention shown in Figure 5, however, the cleat proper 14 is made of angular bar stock, and the arms 15 at the end thereof, one only of which is shown, are made as separate pieces and are attached to the bar 14 by suitable rivets 16. In this form of my invention the ends of the cleats at the sides of the wheel may extend beyond the planes of the sides, thus securing a wider and more firm grip on the ground, as will be understood. The arms or brackets 15 may in this form of my invention be made from cast metal, and the inner ends thereof are provided with inclined wedging surfaces 17 for drawing the cleats down onto the rim of the wheel as the transverse securing bolts are tightened, the same as in the form of my invention hereinbefore explained.

Figure 6 shows a form of my invention in which the cleats are provided with base portions 18, and with projecting ribs 19; the cleat being T-shaped in cross-section in this form of my invention. The arms 10 at the sides of the cleats are substantially the same as the arms of the cleats hereinbefore described; altho in this form of my invention the wedging action whereby the cleats are drawn into firm contact with the periphery of the wheel is secured by cone-shaped wedges 20 upon the transverse rod 11 and which are forced into engagement with the inner edge of the side flanges of the rim as the bolts 11 are tightened, as will be understood.

Having thus described and explained my invention, I claim and desire to secure by Letters Patent:

In combination with a wheel having a rim, a series of inclined driving cleats carried by said rim and arranged about the same, and which cleats are provided each with two inwardly extending arms located one upon each side of the rim when the cleats are in place thereupon; a series of transversely extending bolts disposed within said rim and the ends of which extend, respectively, one through a hole in an arm of one cleat and the other through a hole in an oppositely located arm of another cleat of the series; and wedging means located adjacent the inner ends of each of the arms aforesaid and adapted to engage the inner side edges of said rim to thereby force said cleats into more firm engagement with the rim of the wheel, as said transversely extending bolts are tightened.

In testimony whereof I affix my signature.

ALVARO S. KROTZ.